UNITED STATES PATENT OFFICE.

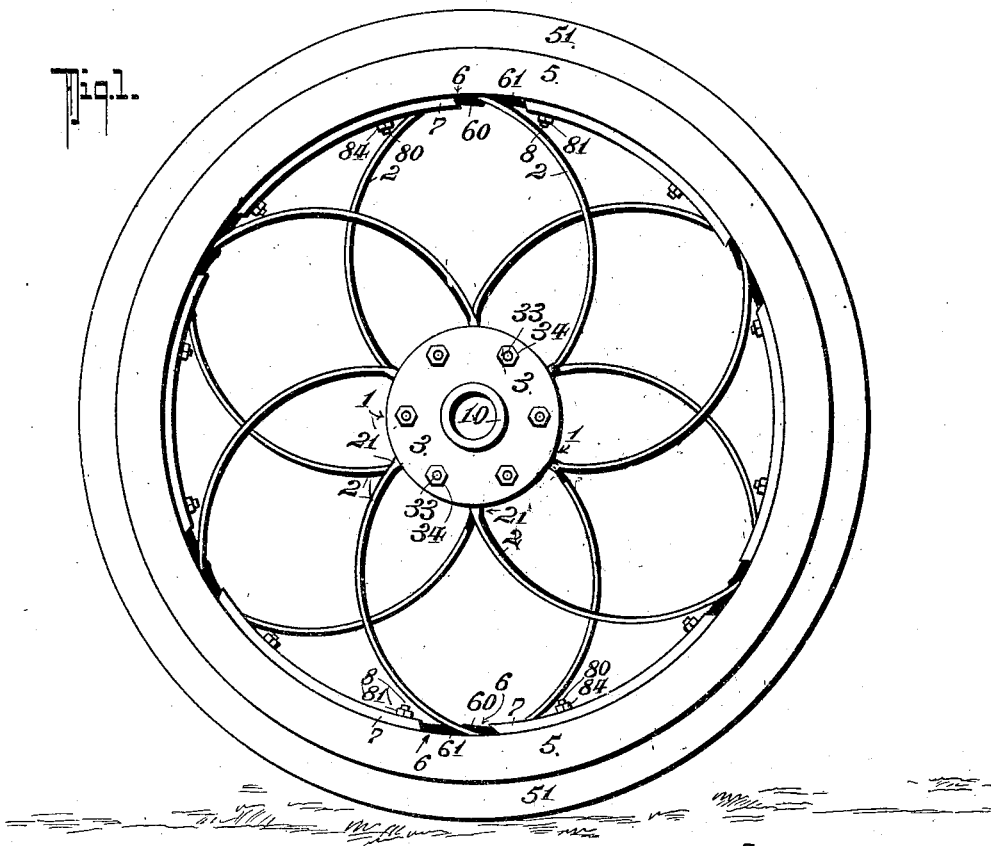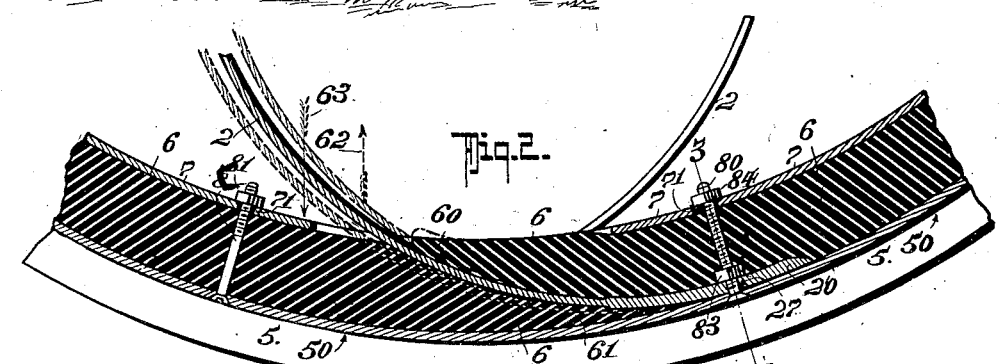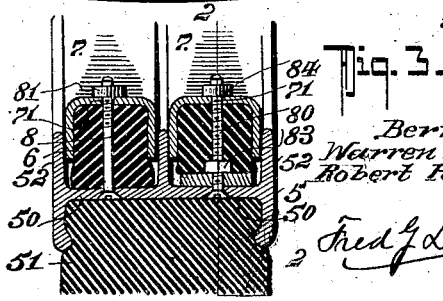

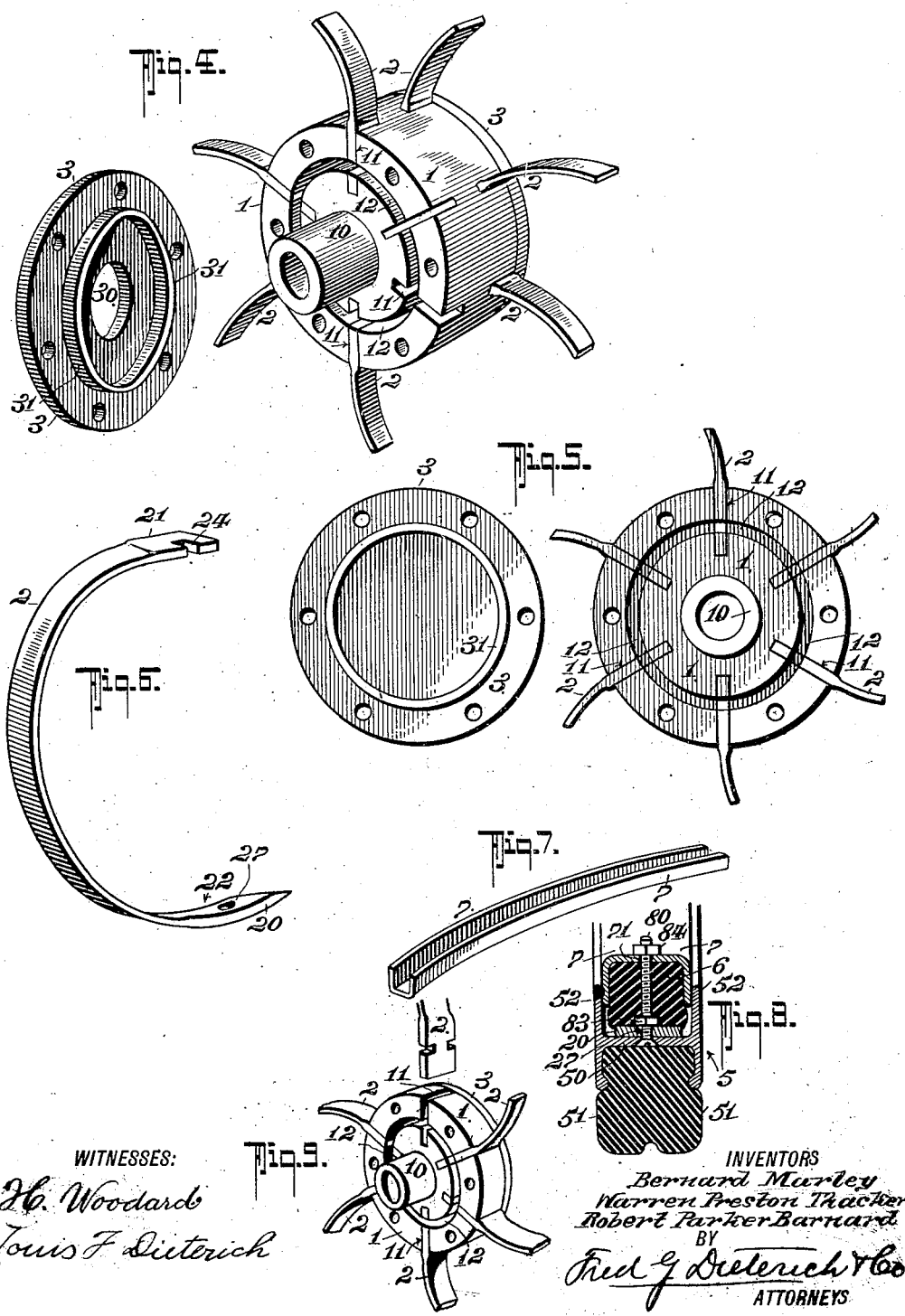

BERNARD MARLEY, WARREN PRESTON THACKER, AND ROBERT PARKER BARNARD, OF NOKOMIS, ILLINOIS.

RESILIENT WHEEL.

1,050,481. Specification of Letters Patent. Patented Jan. 14, 1913.

Application filed May 23, 1912. Serial No. 699,252.

*To all whom it may concern:*

Be it known that we, BERNARD MARLEY, WARREN PRESTON THACKER, and ROBERT PARKER BARNARD, all of Nokomis, county of Montgomery, Illinois, have invented a new and Improved Resilient Wheel, of which the following is a specification.

Our invention has relation to resilient wheels of that type more especially designed for auto-vehicle uses and it has for its object to provide a wheel of the general type stated of a simple and economical construction, in which the several parts are so arranged and coöperatively combined whereby to substantially provide the elastic effect obtained by pneumatic tires and the like, and for providing a durable wheel, the use of which avoids the inconvenience and expense caused by punctured tires.

With other objects in view that will be hereinafter explained, our invention consists in the peculiar construction and novel arrangement of the parts hereinafter described, specifically pointed out in the appended claims, illustrated in the accompanying drawings, in which, Figure 1 is a side elevation of a resilient wheel constructed in accordance with our invention, with the outer or cushion tire applied. Fig. 2 is a longitudinal section of a portion of the wheel taken on the line 2—2 on Fig. 3, with the outer or cushion tire omitted. Fig. 3 is a cross section on the line 3—3 on Fig. 2, the parts being shown on an enlarged scale. Fig. 4 is a perspective view of the hub portion of the wheel, one of the clamping disks or plates being separated from the hub, several of the hub ends of the spokes being shown attached to the said hub portion. Fig. 5 is a face view of the hub, with the spokes applied, the clamping disk for that face of the hub being also shown separated from the hub. Fig. 6 is a perspective view of one of the resilient spokes. Fig. 7 is a detail perspective view of a portion of one of the keepers for holding the elastic cushion against the inner face of the wheel rim, and Figs. 8 and 9 are detail views of modified forms of our invention hereinafter described.

In the drawings, we have shown our improved wheel as especially designed for automobiles and other heavy vehicles, it including two sets of spokes, a hub portion, and a rim especially designed for coöperating with the two sets of spokes, this being a preferred construction of our invention. In its practical arrangement our improved wheel comprises a hub 1. In the preferred construction, the hub 1 is of suitable width and has its opposite faces formed with a series of radial grooves 11, one for the hub end of each spoke 2, presently again referred to, and an annular groove 12 that bisects the several grooves 11 as shown.

3 designates disks or clamping plates, one for each face of the hub 1, and each of the disks has a central aperture 30 for slipping onto the lateral extension 10 of the hub 1, and an annular rib or flange 31 for seating in the annular grooves 12 in the faces of the hub and for another purpose presently explained.

The disks 3 are clamped onto the hub 1 by bolts 33 that pass through the two disks and the hub, and clamp nuts 34 that engage the threaded ends thereof as shown.

In the preferred form of our wheel, two sets of spokes 2, a single hub portion, and a single outer wheel rim are used, the hub and the rim being of suitable width to accommodate the operative application of the two sets of spokes, and the separate cushioning connections or bearings for the outer ends of each set of spokes. The spokes of one set are curved and positioned oppositely to the spokes of the other set, and the two sets of spokes are so mounted that the several spokes of each set cross the spokes of the other set, such arrangement of the spokes being provided to laterally equalize the elasticity, as well as the strain of the spokes, with respect to the wheel rim and the hub.

The spokes 2, which are preferably of stout strap steel, may be of any desired shape in cross section to provide the desired strength and resiliency and these may be curved in various shapes, preferably with the body portion in the arc of a circle, and to add strength at the outer or bearing ends, the said ends are thickened, as at 20.

The inner or hub end 21 of each spoke is bent at a tangent to the body 2, of the spoke, whereby to readily slide into and engage a spoke receiving radial groove in the hub, and the outer or rim end 22 is similarly bent to seat flatwise and ride upon the inner face of the wheel rim, as is best shown on Figs. 2 and 3.

The hub end of each spoke has a notch 24 on one edge, which, when the said end is slipped into its hub groove, registers with the annular groove in the face of the hub and the flanges or rib 31 on the clamping plate or disk 3. When two sets of spokes are used in a complete wheel, one edge only of each hub end of each set of spokes is notched, but when our type of wheel includes but a single set of spokes as shown in Fig. 8, the hub end of each spoke has a notch in each edge as is shown in Fig. 9.

The outer or tire engaging end of each spoke rides upon the inner face of the wheel rim 5, which, in the preferred type of our wheel is of metal, its outer face being concaved or otherwise shaped, as at 50, to receive a cushion or outer tire 51, and it is formed with inwardly extended, two outer annular, flanges 52, and a central flange 53, as is best shown in Fig. 3.

To provide against breaking, the outer ends of the spokes when going over rough road surfaces or when the wheel is subjected to an undue jolt or jar, we have provided an auxiliary elastic bearing connection between the said spokes and the rim, the construction and arrangement of which form an essential feature of our invention. This connection, which is best shown on Fig. 2, consists in the provision of a series of pads or cushion blocks 6, formed of a suitable elastic material, one of said blocks being interposed between the adjacent rim ends of each pair of spokes and the blocks 6 are so shaped and mounted, relatively to the wheel rim, and to the spokes, that one end 60 forms a cushion bearing that tends to take up the inwardly bending strain of the spoke end, when the upper end is pulling away from the hub, see dotted arrow 62 on Fig. 2, while the other end 61 acts as a yielding bearing to take up the strain of the spoke end as it presses downwardly, see full line arrow 63 on Fig. 2, in passing over the road and especially rough places.

Each block 6 is held in place by a U shaped keeper or covering member 7, that fits and rides between the inwardly extended flanges of the wheel rim and which is yieldingly held in place by two bolts 8—80, one of which 8, passes up through the rim, the cushion block 6, and through elongated apertures 71 in the covering member 7, and receives a clamping nut 81. The other bolt 80 passes through an elongated aperture 27 in the spoke end, has a nut 83 for holding the said spoke end onto the rim, passes through the elastic block 6 and the keeper or covering member 7 and has a clamping nut 84.

From the foregoing taken in connection with the drawings, the complete construction of our wheel and its advantages will be apparent to those skilled in the art to which it relates.

By reason of the construction as described and shown, any one of the spokes, in case of breakage, may be readily removed and replaced by a new spoke.

We prefer to use spokes having a bend that presents a nearly half circle from the hub to the rim connection.

It will be noticed that the elastic blocks practically fill the inner rim space between the rim ends of the spokes and lap over that part of the spoke ends that engage the wheel rim. Each spoke acts as a spring member its entire length and since the rim end thereof rests for a distance between elastic pads the latter prevent an abrupt bending or breaking of the spokes at such ends. Further, since the hub ends of the spokes are at a tangent to the body or circular portions of the spokes, the fitting of the spokes on the hub is facilitated and the danger of snapping the spokes at the hub connection is also reduced to the minimum.

What we claim is:

1. In a resilient wheel; a rim channeled on its inner face, and a hub, curved resilient spokes, one end of each spoke being joined with the hub, the other end of each spoke being joined with the rim, elastic packing and filling strips mounted in the rim channel to engage the inner and outer sides of the spokes at the places where the spokes join with the rim, and channeled keepers to fit over said packing and project into the rim channel, and means for holding the keepers, the packing, and the spoke ends in the rim channel.

2. In a wheel of the character described, the combination of a rim having an internal annular groove, a hub, a series of resilient curved spokes secured at the hub ends to the hub, the rim ends of the spokes being extended to seat within the annular groove of the rim, elastic packing held within the annular groove of the rim for engaging the outer face of one spoke end, and the inner face of an adjacent spoke end, and means for holding the said packing and the spoke ends upon the wheel rim.

3. In a wheel of the character described, the combination of a rim having an internal annular groove, a hub, a series of resilient curved spokes secured at the hub ends to the hub, the rim ends of the spokes being extended to seat within the annular groove of the rim, elastic packing held within the annular groove of the rim for engaging the outer face of one spoke end, and the inner face of an adjacent spoke end, means for holding the said packing and the spoke ends upon the wheel rim, of a series of U shaped keepers for engaging the packing at points between the two adjacent spoke ends and nutted screws that engage the rim, the spoke ends, the packing and the keeper.

BERNARD MARLEY.
WARREN PRESTON THACKER.
ROBERT PARKER BARNARD.

Witnesses:
ALBERT O. KETTELKAMP,
WILLIAM A. YOUNG.